United States Patent
Osada (10) Patent No.: US 10,823,107 B2
(45) Date of Patent: Nov. 3, 2020

(54) INTERNAL COMBUSTION ENGINE AND CONTROL METHOD FOR SAME

(71) Applicant: ISUZU MOTORS LIMITED, Tokyo (JP)

(72) Inventor: Hideki Osada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 25 days.

(21) Appl. No.: 15/781,092

(22) PCT Filed: Dec. 2, 2016

(86) PCT No.: PCT/JP2016/085871
§ 371 (c)(1),
(2) Date: Jun. 1, 2018

(87) PCT Pub. No.: WO2017/094875
PCT Pub. Date: Jun. 8, 2017

(65) Prior Publication Data
US 2018/0347504 A1    Dec. 6, 2018

(30) Foreign Application Priority Data

Dec. 3, 2015   (JP) .................................. 2015-236754

(51) Int. Cl.
*F02D 43/00*   (2006.01)
*F02D 21/08*   (2006.01)
(Continued)

(52) U.S. Cl.
CPC ............. *F02D 43/00* (2013.01); *F01N 3/021* (2013.01); *F01N 3/0253* (2013.01);
(Continued)

(58) Field of Classification Search
CPC .... F02D 43/00; F02D 21/08; F02D 2021/083; F02D 2200/602; F02D 2200/702;
(Continued)

(56) References Cited

U.S. PATENT DOCUMENTS 6,032,461 A * 3/2000 Kinugasa ................ F01N 3/023
60/295
6,164,063 A * 12/2000 Mendler ................ F01N 3/2882
60/274
(Continued)

FOREIGN PATENT DOCUMENTS

CN   105121799 A   12/2015
EP   1388647 A2   8/2003
(Continued)

OTHER PUBLICATIONS

International Search Report and Written Opinion for related International Application No. PCT/JP2016/085871, dated Jan. 24, 2017; English translation for ISR provided; 10 pages.
(Continued)

*Primary Examiner* — Hung Q Nguyen
*Assistant Examiner* — Susan E Scharpf
(74) *Attorney, Agent, or Firm* — Procopio, Cory, Hargreaves & Savitch LLP (57) ABSTRACT

A control device (40) is connected to a differential pressure sensor (41), a navigation system (42), and a fuel injection valve (17). The control device (40) is configured to: execute a regeneration control of monitoring a purification situation (C1) and supplying unburned fuel (F2), which is injected from the fuel injection valve (17) and does not contribute to driving, to an exhaust gas purification system (20) in a case where the purification situation (C1) becomes a deteriorated situation (Ca); and execute a control of monitoring a road situation (C2) and stopping the regeneration control before
(Continued)

the road situation (C2) actually becomes an accelerator off situation (Cb) in which an accelerator opening degree (θ1) of an accelerator pedal (43) becomes off.

7 Claims, 7 Drawing Sheets

(51) Int. Cl.
| | |
|---|---|
| *F01N 3/025* | (2006.01) |
| *F02M 26/00* | (2016.01) |
| *F01N 9/00* | (2006.01) |
| *F02D 41/02* | (2006.01) |
| *F01N 3/20* | (2006.01) |
| *F02D 41/00* | (2006.01) |
| *F01N 3/021* | (2006.01) |
| *F02M 26/15* | (2016.01) |
| *F02D 41/40* | (2006.01) |
| *F02M 26/05* | (2016.01) |
| *F02D 41/14* | (2006.01) |

(52) U.S. Cl.
CPC ........... *F01N 3/2066* (2013.01); *F01N 9/002* (2013.01); *F02D 21/08* (2013.01); *F02D 41/0055* (2013.01); *F02D 41/027* (2013.01); *F02M 26/00* (2016.02); *F01N 2900/08* (2013.01); *F01N 2900/12* (2013.01); *F02D 41/405* (2013.01); *F02D 2021/083* (2013.01); *F02D 2041/0017* (2013.01); *F02D 2041/1412* (2013.01); *F02D 2200/602* (2013.01); *F02D 2200/702* (2013.01); *F02M 26/05* (2016.02); *F02M 26/15* (2016.02); *Y02A 50/2325* (2018.01); *Y02T 10/24* (2013.01); *Y02T 10/47* (2013.01)

(58) Field of Classification Search
CPC ........... F02D 41/405; F02D 2041/0017; F02D 2041/1412; F02D 41/027; F02D 41/0055; F01N 3/0253; F01N 3/2066; F01N 9/002; F01N 3/021; F01N 2900/08; F01N 2900/12; Y02T 10/47; Y02T 10/24; Y02A 50/2325; F02M 26/05; F02M 26/15; F02M 26/00
See application file for complete search history.

(56) References Cited

U.S. PATENT DOCUMENTS

| | | | |
|---|---|---|---|
| 6,487,851 B1* | 12/2002 | Okada | F01N 3/0842 60/276 |
| 9,702,315 B1* | 7/2017 | Palmer | F02D 43/00 |
| 2002/0196153 A1* | 12/2002 | Kinugawa | F01N 9/002 340/606 |
| 2006/0016180 A1* | 1/2006 | Tomita | F01N 3/0253 60/297 |
| 2007/0131203 A1* | 6/2007 | Ohga | F02D 41/1467 123/478 |
| 2007/0163242 A1* | 7/2007 | Matsuoka | F01N 3/025 60/286 |
| 2007/0214774 A1* | 9/2007 | Higuchi | F02D 41/025 60/285 |
| 2008/0120962 A1* | 5/2008 | Okugawa | F01N 3/106 60/274 |
| 2009/0281711 A1* | 11/2009 | Ueno | B60L 15/2045 701/104 |
| 2013/0247562 A1 | 9/2013 | Mischler et al. | |
| 2015/0066335 A1* | 3/2015 | Kishi | F02D 41/021 701/103 |
| 2015/0292425 A1 | 10/2015 | Nagaoka et al. | |
| 2016/0053656 A1 | 2/2016 | Bisaiji | |
| 2017/0217510 A1* | 8/2017 | Iwata | B60R 11/02 |

FOREIGN PATENT DOCUMENTS

| | | |
|---|---|---|
| JP | 2003-239724 A | 8/2003 |
| JP | 2004-068784 A | 3/2004 |
| JP | 2005-058036 A | 3/2005 |
| JP | 2005-248762 A | 9/2005 |
| JP | 2006-029239 A | 2/2006 |
| JP | 2006-037857 A | 2/2006 |
| JP | 2006-250116 A | 9/2006 |
| JP | 2008-002636 A | 1/2008 |
| JP | 2008-014157 A | 1/2008 |
| JP | 2014105586 A | 6/2014 |

OTHER PUBLICATIONS

Office Action for related CN App. No. 201680070300.4 dated Jun. 28, 2020. English translation provided; 23 pages.

* cited by examiner

INTERNAL COMBUSTION ENGINE AND CONTROL METHOD FOR SAME

CROSS-REFERENCE TO RELATED APPLICATIONS

This application is a U.S. National Stage entry of PCT Application No: PCT/JP2016/085871 filed on Dec. 2, 2016, which claims priority to Japanese Patent Application No. 2015-236754, filed Dec. 3, 2015, the contents of which are incorporated herein by reference.

TECHNICAL FIELD

The preset disclosure relates to an internal combustion engine and a control method thereof, and more particularly to an internal combustion engine and a control method thereof which prevent excessive unburned fuel from entering an EGR (Exhaust Gas Recirculation) system when an accelerator is off.

BACKGROUND ART

In an engine (internal combustion engine), an EGR system for supplying a portion of an exhaust gas, which is discharged to an exhaust passage, to an intake passage as an EGR gas so as to recirculate the exhaust gas to a cylinder is equipped. The EGR system is configured to cool the EGR gas by an EGR cooler arranged in an EGR passage and to adjust a flow rate of the EGR gas by an EGR valve, thereby enhancing a charging rate of the EGR gas to the cylinder and thus reducing nitrogen oxides in the exhaust gas.

Further, in the engine, an exhaust gas system for purifying the exhaust gas is equipped. As the exhaust gas system, a system is known, in which either or both of a collection filter for collecting particulate matters (PM) and a selective reduction catalyst for reducing nitrogen oxides by a reductant, such as urea water, are arranged downstream of an oxidation catalyst for oxidizing hydrocarbon.

In this regard, a device for regenerating a purification situation of the exhaust gas purification system in a case where the purification situation of the exhaust gas purification system is deteriorated has been proposed (for example, see Patent Document 1). The device is configured to regenerate the purification situation by supplying unburned fuel to the oxidation catalyst of the exhaust gas purification system, oxidizing the unburned fuel by the oxidation catalyst, and then increasing a temperature of the exhaust gas by an oxidation heat, thereby increasing temperatures of the devices arranged downstream of the oxidation catalyst. Here, as an example of deterioration of the purification situation of the exhaust gas purification system, a situation where a large amount of particulate matters is deposited on the collection filter, and a situation where deposits is deposited on the selective reduction catalyst due to the reductant can be exemplified.

However, a large amount of hydrocarbon (HC), which is an organic compound, is contained in the unburned fuel used for regenerating the exhaust gas purification system. Therefore, if the EGR valve of the EGR system is opened during regeneration of the exhaust gas purification system, unburned fuel supplied to the exhaust gas by post-injection or the like is also included in the EGR gas. As a result, hydrocarbon exists in high concentration in the EGR gas.

As described above, if a high concentration of hydrocarbon exists in the EGR gas, the hydrocarbon is condensed and deposited on a wall surface of the EGR passage or in the EGR valve and the EGR cooler and then becomes a binder by oxidation, pyrolysis and the like. Then, particulate matters (PM) are bonded to each other by the binder and then are solidified and fixed as deposits. As a result, there is a problem that the deposits is excessively deposited in the EGR system, thereby causing clogging of the EGR passage or the EGR cooler, malfunction of the EGR value and the like.

In particular, while a temperature of the exhaust gas purification system is increased by supplying of the unburned fuel thereto, a temperature of an exhaust gas is decreased when depression of an accelerator pedal is released, i.e., in a so-called accelerator off state. Therefore, in order to increase temperatures of the exhaust gas and the exhaust gas purification system, a larger amount of unburned fuel has to be supplied and hence there is a risk that excessive unburned fuel enters the EGR system.

PRIOR ART REFERENCE

Patent Document
 Patent Document 1: JP-A-2005-58036

DISCLOSURE OF THE INVENTION

Problems to be Solved

An object of the present disclosure is to provide an internal combustion engine and a control method thereof, in which it is possible to prevent excessive unburned fuel from entering an EGR system in a case where an exhaust gas purification system is being regenerated and an accelerator becomes off.

Means for Solving the Problems

In order to achieve the above abject, the present disclosure provides an internal combustion engine including a fuel injection valve configured to inject fuel into a cylinder; an exhaust gas purification system arranged in an exhaust passage and configured to purify an exhaust gas; an EGR (Exhaust Gas Recirculation) system branched from a midway position of the exhaust passage and joined to a midway position of an intake passage, and configured to recirculate an exhaust gas to the cylinder; a purification situation acquiring device configured to acquire a purification situation of the exhaust gas purification system; a road situation acquiring device configured to acquire a road situation of an road on which a vehicle is planned to travel; and a control device connected to the purification situation acquiring device, the road situation acquiring device, and the fuel injection valve via signal lines, wherein the control device is configured to: execute a regeneration control of monitoring the purification situation via the purification situation acquiring device and supplying unburned fuel, which is fuel that does not contribute to driving among fuel injected from the fuel injection valve, to the exhaust gas purification system in a case where the purification situation becomes a deteriorated situation; and execute a control of monitoring the road situation via the road situation acquiring device and stopping the regeneration control before the road situation actually becomes an accelerator off situation in which an accelerator opening degree of an accelerator pedal becomes off.

Also, in order to achieve the above object, the present disclosure provides a method of controlling an internal combustion engine in which an exhaust gas purification system arranged in an exhaust passage is configured to purify an exhaust gas, and an EGR (Exhaust Gas Recirculation) system branched from a midway position of the exhaust passage and joined to a midway position of an intake passage is configured to recirculate the exhaust gas to a cylinder, the method including: a step of acquiring a purification situation of the exhaust gas purification system; a step of determining whether or not the purification situation has become a deteriorated situation; a step of regenerating the exhaust gas purification system by supplying unburned fuel which does not contribute to driving to the exhaust gas purification system, in a case where it is determined that the purification situation has become the deteriorated situation; a step of acquiring a road situation of a road on which a vehicle is planned to travel; a step of predicting in advance whether or not the road situation will become an accelerator off situation in which an accelerator opening degree of an accelerator pedal becomes off; and a step of stopping the step of regenerating the exhaust gas purification system before the road situation actually becomes the accelerator off situation, in a case where it is predicted that the road situation will become the accelerator off situation.

Herein, the deteriorated situation in the purification situation of the exhaust gas purification system is a situation in which deposits is deposited on each device of the exhaust gas purification system and hence components in the exhaust gas, which has to be removed, cannot be purified. More specifically, this situation is detected as a situation in which a differential pressure between before and behind a collection filter is equal to or higher than a threshold value, or a situation in which a travelling distance or travelling time of a vehicle is equal to or longer than a threshold value.

Regeneration of the exhaust gas purification system is achieved by supplying unburned fuel to an oxidation catalyst to be oxidized and thus increasing temperatures of devices arranged downstream of the oxidation catalyst, thereby burning and removing deposits deposited on the devices.

Specifically, supplying of the unburned fuel includes so-called post-injection, in which fuel injected into a cylinder is discharged in an unburned state into an exhaust passage through an exhaust valve. Alternatively, supplying of the unburned fuel to the exhaust gas purification system may include using an unburned fuel injection valve arranged in the exhaust passage and configured to directly inject unburned fuel into the exhaust gas, instead of the fuel injection valve for injecting fuel into the cylinder.

Therefore, stopping of regeneration of the exhaust gas purification system described herein means that supplying unburned fuel to the exhaust gas purification system is stopped, and specifically that post-injection from the fuel injection valve is stopped or injection from the unburned fuel injection valve is stopped.

The road situation acquiring device is a device for acquiring a gradient of a travelling road on which a vehicle is planned to travel, or a relationship between the vehicle and the preceding vehicle as the road situation. The road situation acquiring device includes any one or combination of a car navigation system for electronically guiding a current location or a route to a destination during traveling of a vehicle, a preceding vehicle tracking device which can measure a vehicle-to-vehicle distance or relative speed to the preceding vehicle by a millimeter-wave radar or the like, a lane departure device and the like. Additionally, a drive recorder for storing a traveling road on which the vehicle has traveled and the like may be employed.

A situation in which the road situation becomes the accelerator off situation means that depression of an accelerator pedal is released by a driver and hence an accelerator opening degree becomes off, i.e., zero. More specifically, the situation is a situation in which the accelerator pedal becomes off when the vehicle is travelling on a downhill road or when a vehicle-to-vehicle distance between the vehicle and the preceding vehicle is decreased. In addition, the accelerator off situation also includes a situation in which a brake pedal is depressed by the driver.

Advantageous Effects of Invention

According to the internal combustion engine and the control method thereof, the road situation is predicted in advance, and before the road situation becomes the accelerator off situation, regeneration of the exhaust gas purification system is stopped, i.e., supplying of the unburned fuel is stopped. Therefore, when the road situation becomes the accelerator off situation, no excessive unburned fuel due to regeneration of the exhaust gas purification system exists in the exhaust passage, thereby preventing the unburned fuel from entering the EGR system. As a result, it is possible to avoid deposits from being excessively deposited in the EGR system and hence to prevent clogging of an EGR passage or an EGR cooler or malfunction of an EGR valve from occurring.

In particular, the internal combustion engine and the control method thereof are suitable for executing a control of keeping the exhaust gas purification system warm by opening the EGR valve when the accelerator opening degree becomes off.

When the accelerator opening degree becomes off, fuel contributing to driving is not injected from the fuel injection valve, and hence a temperature of an exhaust gas is not increased. Thus, an exhaust gas having a low temperature is flowed into the exhaust gas purification system. Therefore, by opening the EGR valve when the accelerator opening degree becomes off, an EGR gas can be recirculated and thus an amount of the exhaust gas having the low temperature and reaching the exhaust gas purification system can be reduced. Therefore, even when the accelerator is in the off state and thus injection of fuel into the cylinder is stopped, the exhaust gas purification system can be kept warm.

In addition, according to the internal combustion engine and the control method thereof, the EGR valve is opened when the accelerator opening degree actually becomes off after regeneration of the exhaust gas purification system is stopped before the road situation becomes the accelerator off situation, thereby keeping the exhaust gas purification system warm. Therefore, it is possible to keep the exhaust gas purification system warm while avoiding deposits from being excessively deposited in the EGR system.

Accordingly, even if regeneration of the exhaust gas purification system is restarted when the accelerator opening degree becomes on, i.e., when injection of fuel contributing to driving is started, the temperature of the exhaust gas purification system is maintained without decreasing. Therefore, the deposits can be quickly burned. As a result, it is possible to reduce an amount of unburned fuel required for regeneration of the exhaust gas purification system. This is advantageous for improving fuel consumption.

MODE FOR CARRYING OUT THE INVENTION

Figure 1:
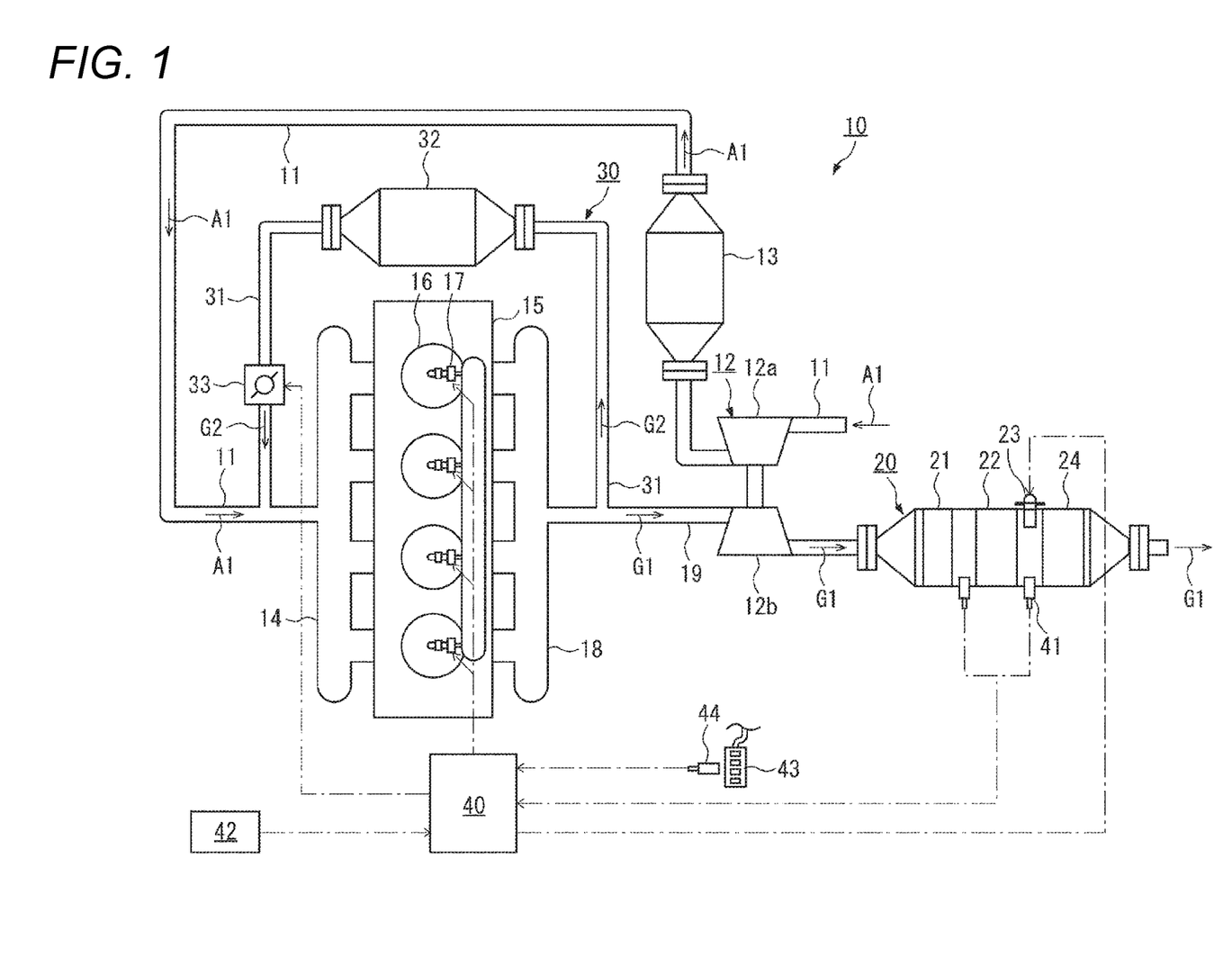
FIG. 1 is a configuration diagram illustrating an engine according to a first embodiment of the present disclosure.

Hereinafter, embodiments of the present disclosure will be described in detail with reference to the accompanying drawings. FIG. 1 illustrates an engine (internal combustion engine) 10 according to a first embodiment of the present disclosure. The engine 10 is configured to purify an exhaust gas G1 discharged to an exhaust passage 19 by an exhaust gas purification system 20 and also to recirculate, as an EGR gas G2, a portion of the exhaust gas G1 discharged to the exhaust passage 19 into an intake passage 11 by an EGR system 30.

Meanwhile, hereinafter, the reference numeral G1 refers to an exhaust gas discharged from a cylinder 16 or discharged to the outside after being purified in the exhaust gas purification system 20, and the reference numeral G2 refers to an EGR gas to be recirculated. Also, the reference numeral F1 refers to fuel, which is injected from an fuel injection valve 17 into the cylinder 16 and then is burned, thereby to contribute to driving, and the reference numeral F2 refers to unburned fuel, which is injected from the fuel injection valve 17 into the cylinder 16 but is not burned and thus discharged to the exhaust passage 19 in an unburned state, thereby not contributing to driving.

In the engine 10, an intake air A1 sucked into the intake passage 11 is compressed by a compressor 12a of a turbocharger 12 and hence has an increased temperature, and then is cooled by an intercooler 13. Thereafter, the intake air A1 is supplied to the cylinder 16 of an engine body 15 through an intake manifold 14. The intake air A1 supplied to the cylinder 16 is mixed with fuel F1 injected from the fuel injection valve 17, burned to generate a thermal energy, and then becomes an exhaust gas G1.

Then, the exhaust gas G1 is exhausted into the exhaust passage 19 through an exhaust manifold 18 and then drives a turbine 12b of the turbocharger 12. Thereafter, the exhaust gas G1 is purified by the exhaust gas purification system 20 and then is discharged into the atmosphere.

In the exhaust gas purification system 20, the exhaust gas G1 is purified by passing through an oxidation catalyst 21, a collection filter 22, and a SCR catalyst (Selective Catalytic Reduction) 24 in this order. Specifically, the oxidation catalyst 21 oxidizes hydrocarbon (HC) and carbon monoxide (CO) contained in the exhaust gas G1. Then, the collection filter 22 oxidizes nitrogen monoxide (NO) by a catalyst carried thereon to generate nitrogen dioxide ($NO_2$), and also collects particulate matters (PM) contained in the exhaust gas G1. Also, in the collection filter 22, the collected particulate matters are oxidized and removed by reacting the particulate matters with the nitrogen dioxide. Then, in the SCR catalyst 24, nitrogen oxide (NOx) contained in the exhaust gas G1 is reduced by SCR reaction using, as a reductant, ammonia ($NH_3$) created by hydrolysis of urea water injected from a urea water injection valve 23.

Meanwhile, although a system, in which both the collection filter 22 and the SCR catalyst 24 are arranged downstream of the oxidation catalyst 21, is illustrated as the exhaust gas purification system 20, a system, in which either of the collection filter 22 and the SCR catalyst 24 is arranged, may be employed. Also, instead of the SCR catalyst 24, a three-way catalyst or a NOx occlusion reduction catalyst (LNT (Lean NOx Trap)) may be employed.

Also, a portion of the exhaust gas G1 is recirculated as an EGR gas G2 from the exhaust passage 19 into the intake passage 11 by the EGR system 30. In the EGR system 30, the EGR gas G2 is cooled by an EGR cooler 32 arranged in an EGR passage 31, which is branched from a midway position of the exhaust passage 19 and is joined to a midway position of the intake passage 11, and also an amount thereof flowing through the EGR passage 31 is adjusted by an EGR valve 33.

Meanwhile, as the EGR system 30, any systems may be employed as long as a branching point of the EGR passage 31 from the exhaust passage 19 is arranged upstream of the exhaust gas purification system 20 in the exhaust passage 19. That is, either of a high pressure type, in which the branching point is arranged upstream of the turbocharger 12, and a low pressure type, in which the branching point is arranged downstream of the turbocharger 12, may be employed. Also, the EGR cooler 32 is an air cooling or water cooling-type cooler. The EGR valve 33 is not limited to being arranged downstream of the EGR cooler 32, but may be arranged upstream of the EGR cooler 32.

The engine 10 includes a control device 40; a differential pressure sensor 41 as a purification situation acquiring device for acquiring a purification situation C1 of the exhaust gas purification system 20; and a navigation system 42 as a road situation acquiring device for acquiring a road situation C2 of a road on which a vehicle (not shown) with the engine 10 mounted thereon is planned to travel. Also, the control device 40 is configured to execute a regeneration control in which the purification situation C1 is monitored and unburned fuel F2 is supplied to the exhaust gas purification system 20 in a case where the purification situation C1 becomes a deteriorated situation Ca. Further, the control device 40 is configured to execute a control of monitoring the road situation C2 and stopping the regeneration control before the road situation C2 actually becomes an accelerator off situation Cb in which an accelerator opening degree θ1 of an accelerator pedal 43 becomes off (zero).

The control device 40 includes a CPU that executes various processes, an internal storage device which allows reading/writing of programs, which are used to execute the various processes, and process results, various interfaces, and the like.

The control device 40 is connected to the differential pressure sensor 41 and the navigation system 42 via signal lines. Also, the control device 40 is connected to the fuel injection valve 17, the urea water injection valve 23 and the EGR valve 33 via signal lines. Additionally, the control device 40 is connected to an accelerator opening degree sensor 44 as an accelerator opening degree acquiring device via a signal line.

Execution programs stored in the internal storage device are read out by the CPU, thereby executing predefined processes. As the execution programs, a regeneration control program, a regeneration stopping program, and a warmth keeping control program, which are described in flow charts, will be illustrated below.

The differential pressure sensor 41 is a sensor including pressure sensors arranged before and behind the collection filter 22, respectively, and configured to detect a differential pressure between pressures of the exhaust gas G1 before and after passing through the collection filter 22.

Meanwhile, although in the present embodiment, the differential pressure sensor 41 is illustrated as the purification situation acquiring device, the present disclosure is not limited thereto, and thus any other devices may be employed as long as the purification situation C1 of the exhaust gas purification system 20 can be acquired. For example, a device for acquiring a deposition situation of particulate matters on the collection filter 22 or a deposition situation of a white product deposited on the SCR catalyst 24 in terms of a traveling distance or traveling time of a vehicle may be also employed. Further, instead of the differential pressure sensor 41, a device for calculating a deposition situation of the particulate matters on the collection filter 22 may be employed.

In other words, the purification situation C1 of the exhaust gas purification system 20, which is acquired by the purification situation acquiring device illustrated as the differential pressure sensor 41, is a deposition situation of deposits on each of the devices of the exhaust gas purification system 20. That is, the deteriorated situation Ca means a situation, in which a deposition situation on each of the devices is deteriorated to the extent that components in the exhaust gas G1, which have to be removed, cannot be purified. More specifically, in the present embodiment, the deteriorated situation Ca is a situation in which a differential pressure between before and behind the collection filter 22 detected by the differential pressure sensor 41 is equal to or higher than a threshold value. Alternatively, a situation in which a traveling distance or traveling time of a vehicle is a distance or time at which a deposition amount of particulate matters on the collection filter 22 is equal to or larger than a threshold value, or a situation in which a traveling distance or traveling time of a vehicle is a distance or time at which a deposition amount of white product deposited on the SCR catalyst 24 due to urea water is equal to or larger than a threshold value may be employed as the deteriorated situation Ca.

The navigation system 42 is a system for electronically guiding a current location or a route to a destination during traveling of a vehicle. More specifically, the navigation system 40 is a system for acquiring a gradient θ2 of a traveling road, on which the vehicle is planned to travel, or for acquiring a relative relationship R1 between the vehicle and the preceding vehicle, such as traffic congestion information, by communicating with a global positioning system (GPS) or a server in which three-dimensional road data is stored.

Meanwhile, although in the present embodiment, the navigation system 42 is illustrated as the road situation acquiring device, a preceding vehicle tracking device, which can measure a vehicle-to-vehicle distance or relative speed to the preceding vehicle by a millimeter-wave radar or the like, a lane departure device and the like may be also employed. Further, a drive recorder for storing a traveling road on which the vehicle has traveled may be employed.

The road situation C2 acquired by the road situation acquiring device illustrated as the navigation system 42 is the gradient θ2 or the relative relationship R1 including a relative speed or vehicle-to-vehicle distance to the preceding vehicle. Also, the accelerator off situation Cb is a situation, in which depression of the accelerator pedal 43 is released by a driver and hence the accelerator opening degree θ1 becomes off, i.e., zero. More specifically, when a vehicle with the engine 10 mounted thereon is travelling on a downhill road having a gradient θ2 or when the relative relationship R1 between the vehicle and the preceding vehicle becomes an approaching relationship, the accelerator pedal 43 becomes off by the driver. In addition, the accelerator off situation Cb also includes a situation in which a brake pedal (not shown) is depressed by the driver.

Meanwhile, with respect to the gradient θ2, whether or not the road situation C2 is the accelerator off situation Cb can be determined on the basis of whether or not the gradient θ2 is equal to or greater than a gradient, at which a forward force exerted on a vehicle by a gravitational acceleration is equal to or higher than a travelling resistance and hence a vehicle speed is not decreased even when a driving power of the engine 10 is not imparted thereto. The gradient θ2 is based on a vehicle weight of a vehicle and has a negative correlation to the vehicle weight. Therefore, it is preferable that the heavier the vehicle weight, the smaller the gradient θ2 is set. For example, in a case where a vehicle weight of a HEV is 25 t, a gradient of 2% is exemplified as the gradient θ2.

Further, with respect to the relative relationship R1, whether or not the road situation C2 is the accelerator off situation Cb can be determined on the basis of whether or not a vehicle-to-vehicle distance between a vehicle and the preceding vehicle, which is travelling on the same lane as that on which the vehicle is travelling, or a relative speed of the preceding vehicle to the vehicle, is an approaching relationship. As the vehicle-to-vehicle distance representing the approaching relationship, a distance obtained by subtracting a predetermined value from a value of a vehicle speed can be employed in a case where the vehicle speed is equal to or lower than 60 km/h (e.g., if the vehicle speed is 40 km/h and the predetermined value is 15, the approaching distance is 25 m), or a distance corresponding to a value of a vehicle speed can be employed in a case where the vehicle speed exceeds 60 km/h (e.g., if the vehicle speed is 80 km/h, the approaching distance is 80 m). Further, as the relative speed representing the approaching relationship, −10 km/h or lower can be employed in a case where the vehicle-to-vehicle distance is equal to or shorter than the approaching distance. Additionally, the relative relationship R1 may include a case where traffic congestion exists on the same lane as that of the vehicle or a case where a traffic signal on a travelling road, on which the vehicle is planned to travel, is a red light.

Figure 2:
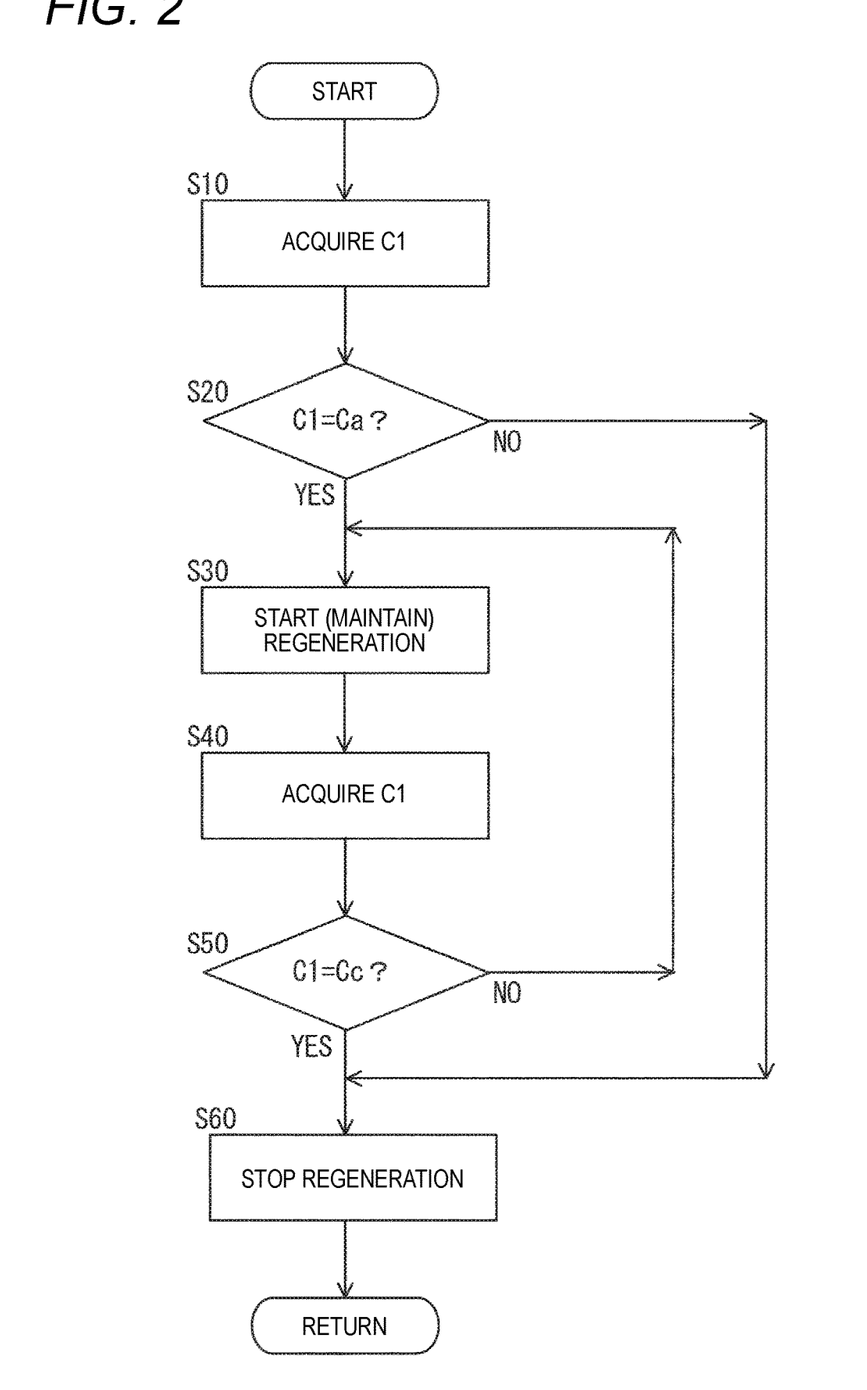
FIG. 2 is a flow chart illustrating a control process for regeneration of an exhaust gas purification system in a control method for the engine according to an embodiment of the present disclosure.
Figure 3:
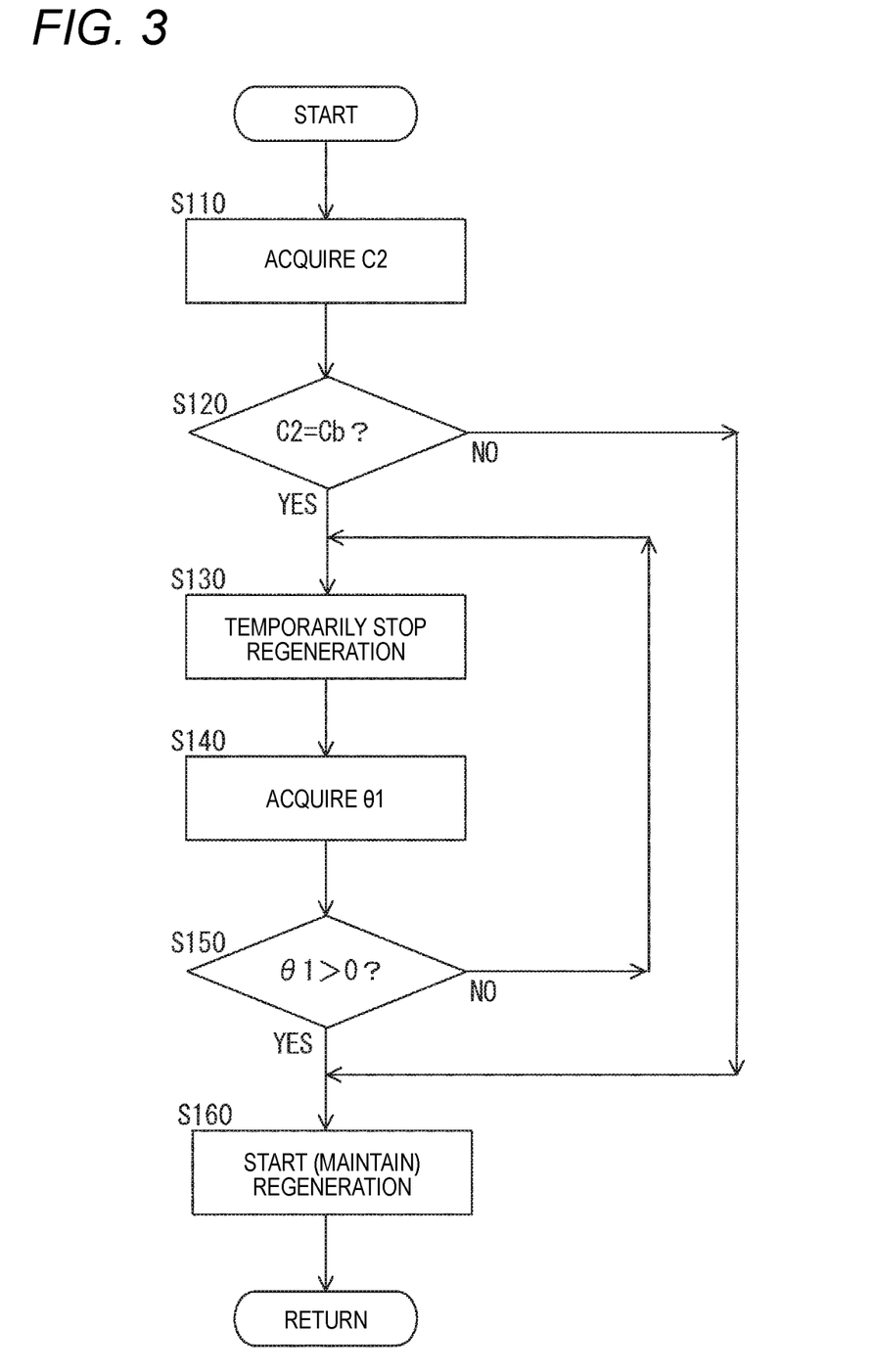
FIG. 3 is a flow chart illustrating a control process for stopping regeneration of the exhaust gas purification system in the control method for the engine according to the embodiment of the present disclosure.
Figure 4:
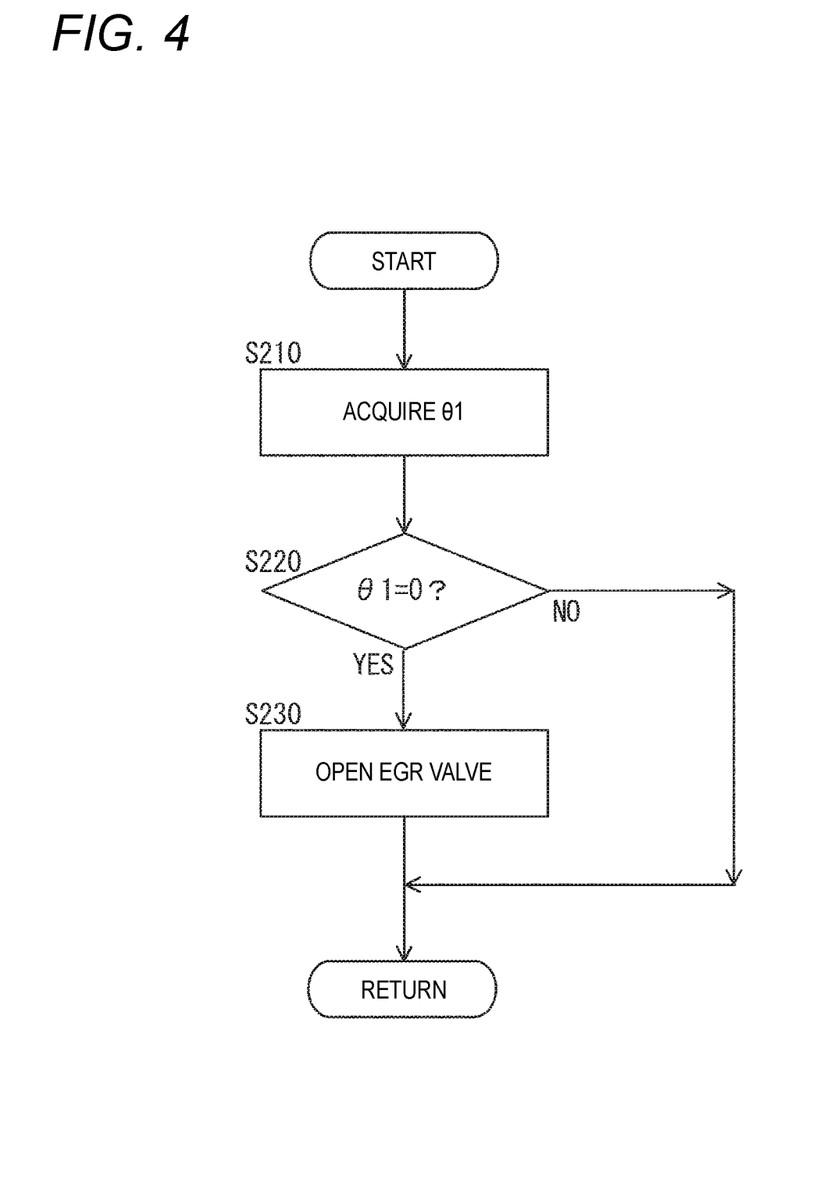
FIG. 4 is a flow chart illustrating a control process for keeping the exhaust gas purification system warm in the control method for the engine according to the embodiment of the present disclosure.

Next, a control method for the engine 10 as functions of the control device 40 will be described below with reference to flow charts of FIGS. 2 to 4. Meanwhile, the control method starts if a vehicle with the engine 10 mounted thereon starts to travel.

First of all, the following steps S10 to S40 are executed by the regeneration program. First, in the step S10, the control device 40 acquires the purification situation C1 of the exhaust gas purification system 20 via the differential pressure sensor 41.

Subsequently, in the step S20, the control device 40 determines whether or not the purification situation C1 has become the deteriorated situation Ca. Specifically, the control device 40 determines whether or not a value detected by the differential pressure sensor 41 is equal to or higher than a threshold value. In the step S20, in a case where it is determined that the purification situation C1 has become the deteriorated situation Ca, the process proceeds to the step S30. In a case where it is determined that the purification situation C1 has not become the deteriorated situation Ca, the process proceeds to the step S60.

Subsequently, in the step S30, the control device 40 performs regeneration of the exhaust gas purification system 20. The step S30 is a step of supplying unburned fuel F2 to the exhaust gas purification system 20.

More specifically, the step S30 is a step of supplying unburned fuel F2, which is fuel in an unburned state and thus does not contribute to driving among the fuel injected from the fuel injection valve 17 into the cylinder 16, to the oxidation catalyst 21 by so-called post-injection in which the unburned fuel F2 is discharged to the exhaust passage 19 through an exhaust valve (not shown). Meanwhile, in the step S30, in a case where regeneration is already being performed, injection of the unburned fuel F2 is maintained.

If the unburned fuel F2 is supplied to the oxidation catalyst 21 by the step S30, the oxidation catalyst 21 oxidizes the unburned fuel F2 and hence a temperature of the exhaust gas G1 is increased by an oxidation heat thereof. In addition, temperatures of the collection filter 22 and the SCR catalyst 24 arranged downstream of the oxidation catalyst 21 are also increased, so that deposits deposited on the collection filter 22 or the SCR catalyst 24 is burned and removed. Therefore, as the deposits is removed, the purification situation C1 of the exhaust gas purification system 20 is recovered.

Subsequently, in the step S40, the control device 40 acquires the purification situation C1 again. Subsequently, in the step S50, the control device 40 determines whether or not the purification situation C1 has become a normal situation Cc. The normal situation Cc is a situation in which deposits on each of the devices of the exhaust gas purification system 20 has been burned and removed by regeneration of the exhaust gas purification system 20. Specifically, in the present embodiment, the normal situation Cc is a situation in which a differential pressure detected by the differential pressure sensor 41 is lower than a threshold value (value different from the threshold value in the step S20) which is set to be close to zero. In the step S50, in a case where it is determined that the purification situation C1 has become the normal situation Cc, the process proceeds to the step S60. On the other hand, in a case where it is determined that the purification situation C1 has not become the normal situation Cc, the process returns the step S30 again, thereby maintaining regeneration.

Subsequently, in the step S60, the control device 40 stops regeneration of the exhaust gas purification system 20. The step S60 is a step of stopping supplying the unburned fuel F2 to the exhaust gas purification system 20, and specifically a step of stopping injecting the unburned fuel F2 from the fuel injection valve 17.

If the step S60 is completed, the process returns to the start thereof and then repeats the steps S10 to S60 until the engine 10 is stopped.

Subsequently, if regeneration of the exhaust gas purification system 20 is performed in the step S30, the regeneration stopping program executes the following steps S110 to S160. First, in the step S110, the control device 40 acquires the road situation C2 via the navigation system 42.

Subsequently, in the step S120, the control device 40 predicts in advance whether or not the road situation C2 will become the accelerator off situation Cb. The step 120 is a step of predicting in advance the road situation C2, not determining whether or not the road situation C2 has actually become the accelerator off situation Cb. That is, the step S120 is a step of predicting the road situation C2 at a location before the road situation C2 becomes the accelerator off situation Cb, at a time before a vehicle with the engine 10 mounted thereon travels in the road situation C2 which is the accelerator off situation Cb. Specifically, the step S120 is a step of predicting whether or not a gradient θ2 of a travelling road, on which the vehicle has to travel from now on, will become equal to or greater than a threshold value or whether or not the relative relationship R1 to the preceding vehicle will become the approaching relationship. In the step S120, in a case where it is predicted that the road situation C2 will become the accelerator off situation Cb, the process proceeds to the step S130. On the other hand, in a case where it is predicted that the road situation C2 will not become the accelerator off situation Cb, the process proceeds to the step S160.

Subsequently, in the step S130, the control device 40 temporarily stops regeneration of the exhaust gas purification system 20. The step S130 is a step of temporarily stopping supplying the unburned fuel F2 to the exhaust gas purification system 20 before the road situation C2 actually becomes the accelerator off situation Cb. More specifically, the step S130 is a step of temporarily stopping injecting the unburned fuel F2 from the fuel injection valve 17 before the road situation C2 actually becomes the accelerator off situation Cb, so that at a time when the road situation C2 becomes the accelerator off situation Cb, supplying of the unburned fuel F2 has already been stopped.

Subsequently, in the step S140, the control device 40 acquires the accelerator opening degree θ1 via the accelerator opening degree sensor 44. Subsequently, in the step S150, the control device 40 determines whether or not the accelerator opening degree θ1 is on, i.e., whether or not the accelerator pedal 43 is depressed by a driver and hence the accelerator opening degree θ1 is greater than zero. In the step S150, in a case where it is determined that the accelerator opening degree θ1 is on, the process proceeds to the step S160. On the other hand, in a case where it is determined that the accelerator opening degree θ1 is not on, the process returns to the step S130 so that temporary stopping of regeneration of the exhaust gas purification system 20 is maintained.

Subsequently, in the step S160, the control device 40 restarts regeneration of the exhaust gas purification system 20. The step S160 is a step of restarting supplying the unburned fuel F2 to the exhaust gas purification system 20, more particularly to the oxidation catalyst 21.

That is, the phrase "temporarily stopping" in the step S130 means that only in a case where the road situation C2 becomes the accelerator off situation Cb while the exhaust gas purification system 20 is regenerated in the steps S10 to S60, regeneration is temporarily stopped. Such a temporary period Δt1 include a period of time from a time when the accelerator opening degree θ1 becomes zero in the step S150 until the accelerator opening degree θ1 exceeds zero. Alternatively, although not shown in the step S150, the temporary period Δt1 may include a period of time until a preset time elapse from a time when it is presumed that the road situation C2 will become the accelerator off situation Cb (the period is a period intended to cope with a case where the road situation C2 does not become the accelerator off situation Cb since the preceding vehicle increases a speed or the like).

The steps S110 to S160 are executed until regeneration of the exhaust gas purification system 20 is stopped. Thus, if regeneration of the exhaust gas purification system 20 is stopped in the steps S10 to S60, the steps S110 to S160 are ended forcibly.

Next, while the steps S10 to S60 and the steps S110 to S160 are executed, the warmth keeping control program executes the following steps S210 to S230. First, in the step S210, the control device 40 acquires the accelerator opening degree $\theta 1$ via the accelerator opening degree sensor 44. Subsequently, in the step S220, the control device 40 determines whether or not the accelerator opening degree $\theta 1$ has become off, i.e., whether or not depression of the accelerator pedal 43 is released by a driver and hence the accelerator opening degree $\theta 1$ has become zero. In the step S220, in a case where it is determined that the accelerator opening degree $\theta 1$ has become off, the process proceeds to the step S230. On the other hand, in a case where it is determined that the accelerator opening degree $\theta 1$ has not become off, the process returns to the start thereof.

Subsequently, in the step S230, the control device 40 opens the EGR valve 33 to open the EGR passage 31. In the step S230, it is preferable to open the EGR valve 33 to a degree corresponding to a fully opened state (100%) or a generally fully opened state (70% to 90%). Thus, if the EGR valve 33 is opened, most of the exhaust gas G1 having a low temperature during the accelerator off state is recirculated as the EGR gas G2. Therefore, the exhaust gas purification system 20 is prevented from being cooled due to the exhaust gas G1 having the low temperature, which would otherwise have reached the exhaust gas purification system 20. If the step S230 is completed, the process returns to the start thereof.

Figure 5:
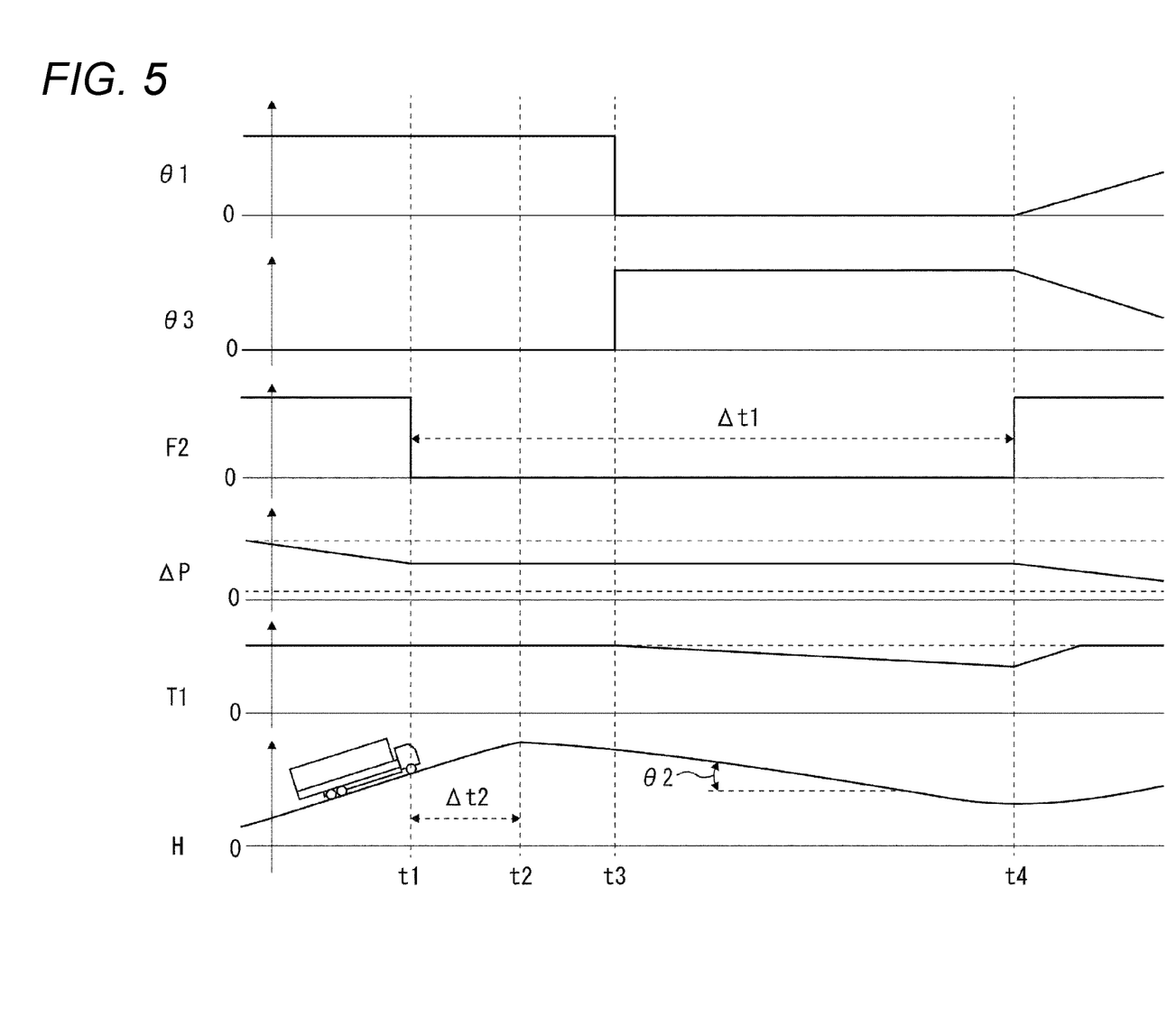
FIG. 5 is a correlation diagram illustrating a correlation between a travelling time on a downhill road and each of parameters.
Figure 6:
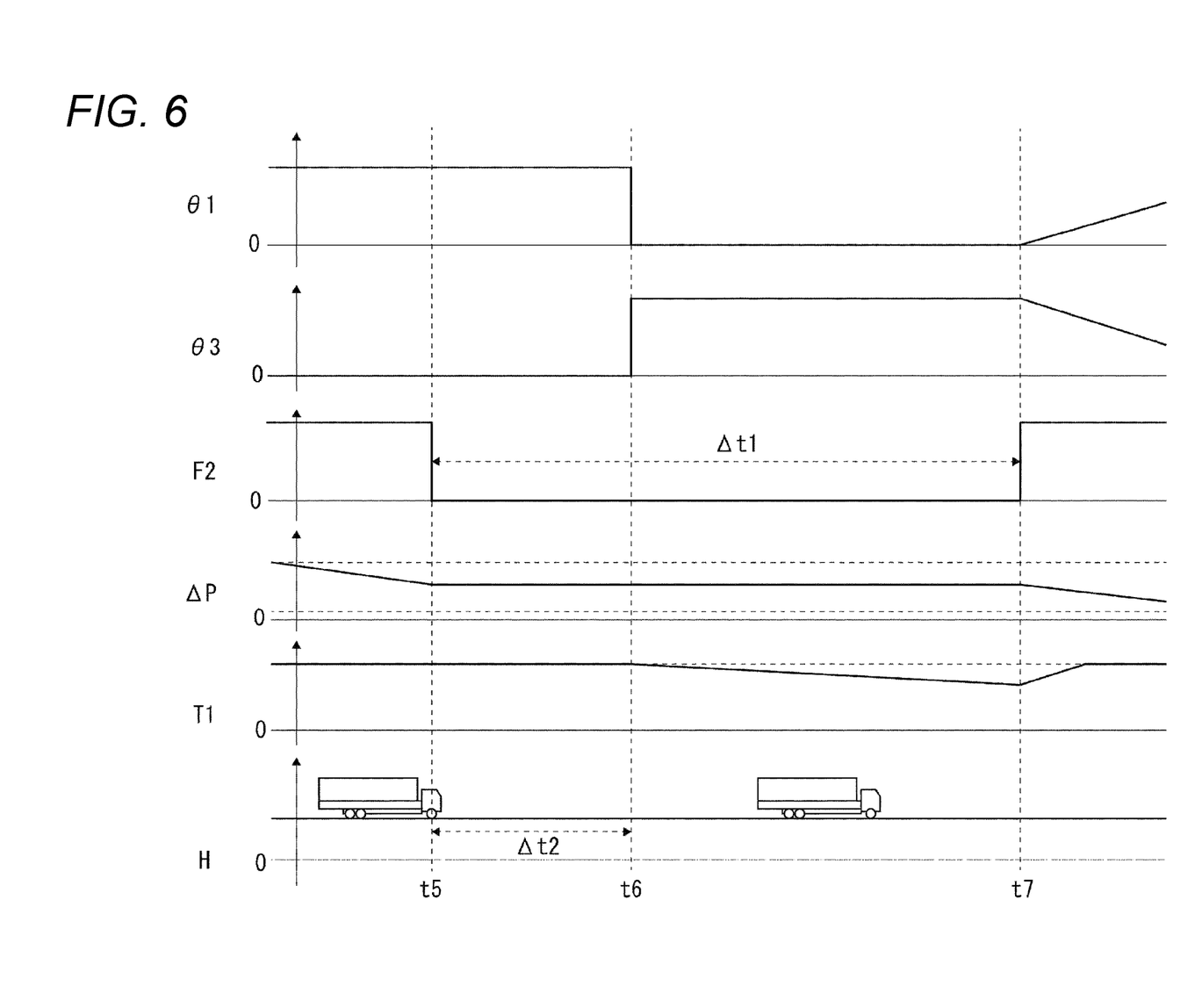
FIG. 6 is a correlation diagram illustrating a correlation between a time approaching to the preceding vehicle and each of parameters.

FIGS. 5 and 6 illustrate correlations between a traveling time of a vehicle with the engine 10 mounted thereon and each parameter, in which FIG. 5 shows a case where the vehicle is travelling on a downhill road and FIG. 6 shows a case where the preceding vehicle exists. Meanwhile, in the figures, the reference numeral $\theta 3$ refers to an opening degree of the EGR valve 33 and the reference numeral T1 refers to a temperature of the collection filter 22. Also, in the figures, it is assumed that at a time to, the steps S10 to S60 are executed and thus regeneration of the exhaust gas purification system 20 is performed.

As shown in FIG. 5, at a time t1, the steps S110 to S130 are executed and thus it is predicted that the vehicle will travel on a downhill road at which the road situation C2 will become the accelerator off situation Cb. As a result, regeneration of the exhaust gas purification system 20 is temporarily stopped.

A time t2, at which the step S130 is executed, is preferably a timing, at which the unburned fuel F2 does not substantially exist in the exhaust passage 19 when the road situation C2 has actually become the accelerator off situation Cb. More specifically, an elapsed time $\Delta t2$ from the time t1, at which injection of fuel from the fuel injection valve 17 which does not contribute to driving is stopped, to the time t2, at which the road situation C2 becomes the accelerator off situation Cb, is preferably set to a period of time until an exhaust gas G1 lastly discharged from the cylinder 16 passes through the branching point between the exhaust passage 19 and the EGR passage 31. With respect to the elapsed time $\Delta t2$, it is preferable that periods of time until the exhaust gas G1 lastly discharged from the cylinder 16 passes through the branching point between the exhaust passage 19 and the EGR passage 31 are obtained in advance by experiments or tests and the average value thereof or the like is set as the elapsed time $\Delta t2$.

Subsequently, after the road situation C2 becomes the accelerator off situation Cb at the time t2, depression of the accelerator pedal 43 is actually released by a driver at a time t3, and hence the accelerator opening degree $\theta 1$ becomes off. At the time t3, the steps S210 to S230 are executed.

Subsequently, during a period of time from the time t3 to a time t4, i.e., from the time when depression of the accelerator pedal 43 is released by the driver to a time when the accelerator pedal 43 is again depressed by the driver, the steps S130 to S150 are executed so that regeneration of the exhaust gas purification system 20 is temporarily stopped. Also, at the same time, the steps S210 to S230 are executed, thereby keeping the exhaust gas purification system 20 warm.

Then, if the driver actually depresses the accelerator pedal 43 at the time t4, the steps S150 and S160 are executed so that regeneration of the exhaust gas purification system 20 is restarted.

As shown in FIG. 6, at a time t5, the steps S110 to S130 are executed and thus it is predicted that a relationship between the vehicle and the preceding vehicle will become the accelerator off situation Cb, i.e., the vehicle and the preceding vehicle will approach each other as the preceding vehicle stops or slows down. As a result, regeneration of the exhaust gas purification system 20 is temporarily stopped.

Subsequently, when the road situation C2 becomes the accelerator off situation Cb at the time t6, depression of the accelerator pedal 43 is actually released by the driver and hence the accelerator opening degree $\theta 1$ becomes off. At the time t6, the steps S210 to S230 are executed.

Subsequently, during a period of time from the time t6 to a time t7, i.e., a period of time until the accelerator pedal 43 is again depressed by the driver, the steps S130 to S150 are executed so that regeneration of the exhaust gas purification system 20 is temporarily stopped. Also, at the same time, the steps S210 to S230 are executed, thereby keeping the exhaust gas purification system 20 warm.

Then, if a speed of the preceding vehicle is increased at the time t7 and thus the driver actually depresses the accelerator pedal 43, the steps S150 and S160 are executed so that regeneration of the exhaust gas purification system 20 is restarted.

Meanwhile, a period of time from the time t1 to time t4 in FIG. 5 and a period of time from the time t5 to the time t7 in FIG. 6 correspond to the temporary period $\Delta t1$ during which regeneration of the exhaust gas purification system 20 is temporarily stopped.

Since the controls as described above are executed, regeneration of the exhaust gas purification system 20 is temporarily stopped when it is predicted that the road situation C2 will become the accelerator off situation Cb. Owing to such temporary stopping, no excessive unburned fuel F2 due to regeneration of the exhaust gas purification system 20 exists in the exhaust passage 19 when the road situation C2 actually becomes the accelerator off situation Cb. Therefore, it is possible to prevent the unburned fuel F2 from entering the EGR system 30, thereby avoiding deposits from being excessively deposited in the EGR system 30. As a result, it is possible to prevent clogging of the EGR passage 31 or the EGR cooler 31 or malfunction of the EGR valve 33.

Also, when the accelerator opening degree $\theta 1$ becomes off, it is possible to avoid deposits from being excessively deposited in the EGR system 30 if being combined with the control of keeping the exhaust gas purification system 20 warm by opening the EGR valve 33. Meanwhile, when the accelerator opening degree $\theta 1$ becomes off, it is possible to reduce an amount of the exhaust gas G1 having a low temperature and reaching the exhaust gas purification system 20, since the EGR valve 33 is opened and the EGR gas G2 is recirculated. Therefore, even when the accelerator is in the off state and thus injection of fuel into the cylinder 16 is stopped, the exhaust gas purification system 20 can be kept warm.

Thus, even if regeneration of the exhaust gas purification system 20 is restarted when the accelerator opening degree θ1 becomes on and thus injection of fuel F1 contributing to driving is started, a temperature of the exhaust gas purification system 20 is maintained without decreasing. Therefore, the deposits can be quickly burned. As a result, it is possible to reduce an amount of unburned fuel F2 required for regeneration of the exhaust gas purification system 20, i.e., unburned fuel F2 which does not contribute to driving. This is advantageous for improving fuel consumption.

Figure 7:
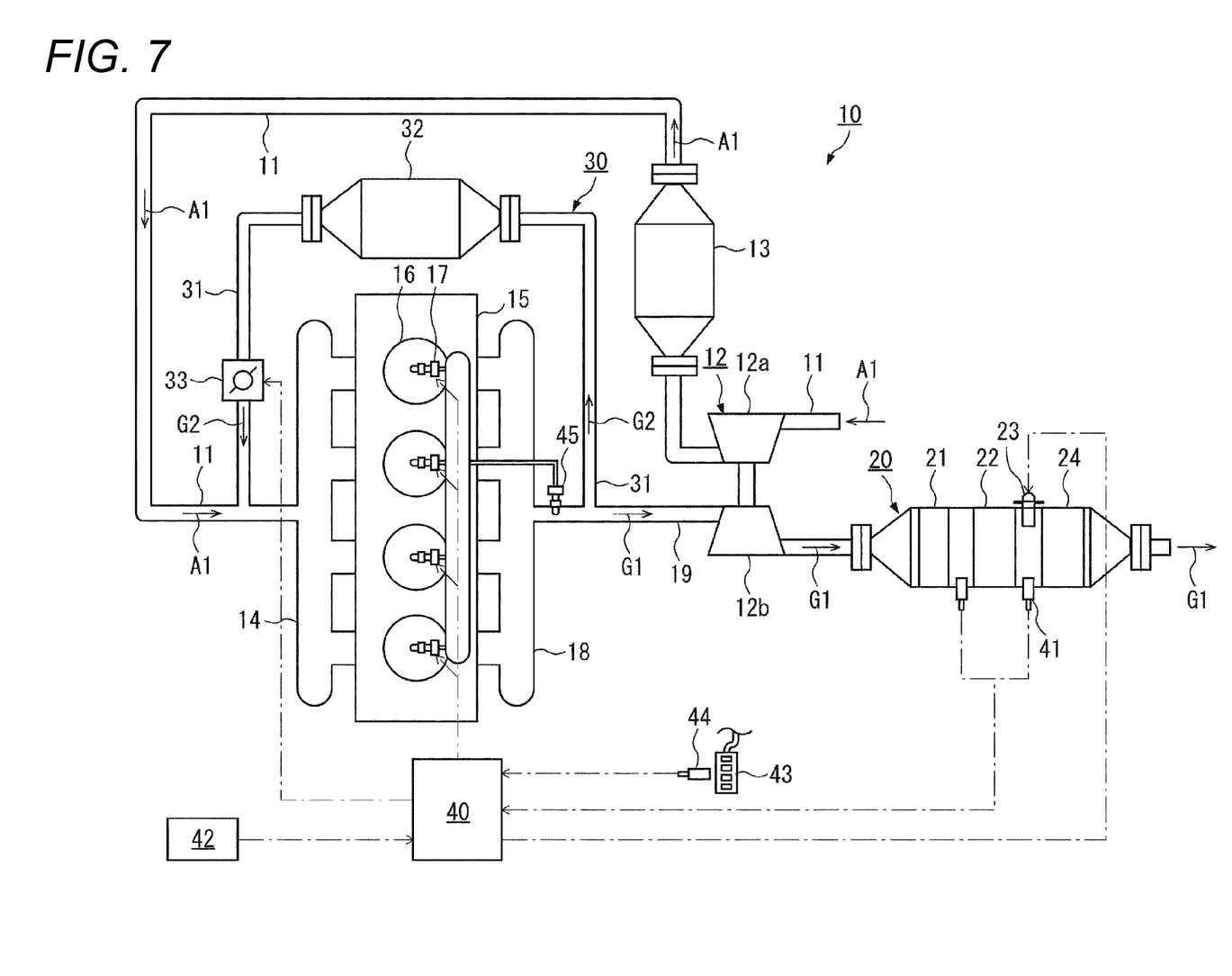
FIG. 7 is a configuration diagram illustrating an engine according to a second embodiment of the present disclosure.

FIG. 7 illustrates an engine 10 according to a second embodiment of the present disclosure. The engine 10 further includes an unburned fuel injection valve 45 arranged in an exhaust passage 19 and configured to inject unburned fuel F2, in addition to the configuration of FIG. 1.

The unburned fuel injection valve 45 is arranged in a portion of the exhaust passage 19 which is located upstream of a branching point to an EGR passage 31 of an EGR system 30 in a flowing direction of an exhaust gas G1. Here, the unburned fuel injection valve 45 may be arranged at any location as long as it is located upstream of the branching point to the EGR passage 31, and thus may also be arranged inside an exhaust manifold 18.

According to this configuration, the control device 40 is configured to execute a control of supplying, to the exhaust gas purification system 20, unburned fuel F2 which is injected from the unburned fuel injection valve 45 to the exhaust gas purification system 20 for regeneration control, instead of supplying unburned fuel F2 which is fuel that does not contribute to driving among fuel injected from the fuel injection valve 17.

Since controls similar to those as described before are also executed in the present embodiment, it is possible to prevent excessive unburned fuel F2 from entering the EGR system 30 due to regeneration of the exhaust gas purification system 20 during an accelerator off state.

This application is based on Japanese Patent Application No. 2015-236754 filed on Dec. 3, 2015, the entire contents of which are incorporated herein by reference.

INDUSTRIAL APPLICABILITY

The internal combustion engine and the control method thereof according to the present disclosure is useful in that it is possible to prevent excessive unburned fuel from entering an EGR system in a case where an exhaust gas purification system is being regenerated and an accelerator becomes off.

REFERENCE SIGNS LIST

10: Engine
11: Intake passage
16: Cylinder
17: Fuel injection valve
19: Exhaust passage
20: Exhaust gas purification system
30: EGR system
40: Control device
41: Differential pressure sensor
42: Navigation system C1: Purification situation
C2: Road situation
Ca: Deteriorated situation
Cb: Accelerator off situation
F2: Unburned fuel

The invention claimed is:

1. An internal combustion engine comprising:
a fuel injection valve configured to inject fuel into a cylinder;
an exhaust catalyst arranged in an exhaust passage and configured to purify an exhaust gas;
an EGR (Exhaust Gas Recirculation) system branched from a midway position of the exhaust passage and joined to a midway position of an intake passage, and configured to recirculate an exhaust gas to the cylinder;
a differential pressure sensor configured to acquire a purification situation of the exhaust catalyst;
a navigation system configured to acquire a road situation of a road on which the vehicle is planned to travel, wherein the road situation is either a gradient of the road or a relationship between the vehicle and a preceding vehicle; and
an electronic controller connected to the differential pressure sensor, the navigation system, and the fuel injection valve via signal lines,
wherein the electronic controller is configured to:
execute a regeneration control of monitoring the purification situation via the differential pressure sensor and supplying unburned fuel, which is fuel that does not contribute to driving among fuel injected from the fuel injection valve, to the exhaust catalyst in a case where the purification situation becomes a deteriorated situation; and
execute a control of monitoring the road situation via the navigation system, predicting, at a time before the vehicle travels the road situation, whether or not the road situation becomes an accelerator off situation in which an accelerator opening degree of an accelerator pedal becomes off, and stopping the regeneration control when it is predicted that the road situation becomes the accelerator off situation.

2. The internal combustion engine according to claim 1, further comprising:
an accelerator opening degree sensor configured to acquire the accelerator opening degree,
wherein the electronic controller is connected to the accelerator opening degree sensor via a signal line,
wherein the electronic controller is configured to execute a control of monitoring the accelerator opening degree via the accelerator opening degree sensor and opening an EGR valve arranged in an EGR passage of the EGR system when the accelerator opening degree becomes off.

3. The internal combustion engine according to claim 2, wherein the electronic controller is configured to execute a control of restarting the regeneration control when the accelerator opening degree actually becomes off and then on after the regeneration control is stopped, before the road situation becomes the accelerator off situation.

4. An internal combustion engine comprising:
an exhaust catalyst arranged in an exhaust passage and configured to purify an exhaust gas;
an EGR (Exhaust Gas Recirculation) system branched from a midway position of the exhaust passage and joined to a midway position of an intake passage, and configured to recirculate an exhaust gas to the cylinder;

a differential pressure sensor configured to acquire a purification situation of the exhaust catalyst;

a navigation system configured to acquire a road situation of a road on which a vehicle is planned to travel;

an electronic controller connected to the differential pressure sensor and the navigation system via signal lines; and an unburned fuel injection valve arranged in a portion of the exhaust passage which is located upstream of a branching point to an EGR passage of the EGR system in a flowing direction of an exhaust gas, wherein the electronic controller is configured to:

execute a regeneration control of monitoring the purification situation via the differential pressure sensor and supplying unburned fuel injected from the unburned fuel injection valve, to the exhaust catalyst in a case where the purification situation becomes a deteriorated situation; and     execute a control of monitoring the road situation via the navigation system, predicting, at a time before the vehicle travels the road situation, whether or not the road situation becomes an accelerator off situation in which an accelerator opening degree of an accelerator pedal becomes off, and stopping the regeneration control when it is predicted that the road situation becomes the accelerator off situation.

5. A method of controlling an internal combustion engine in which an exhaust catalyst arranged in an exhaust passage is configured to purify an exhaust gas, and an EGR (Exhaust Gas Recirculation) system branched from a midway position of the exhaust passage and joined to a midway position of an intake passage is configured to recirculate the exhaust gas to a cylinder, the method comprising:

acquiring a purification situation of the exhaust catalyst;

determining whether or not the purification situation has become a deteriorated situation;

regenerating the exhaust catalyst by supplying unburned fuel which does not contribute to driving to the exhaust catalyst, in a case where it is determined that the purification situation has become the deteriorated situation;

acquiring a road situation of a road on which the vehicle is planned to travel, wherein the road situation is either a gradient of the road or a relationship between the vehicle and a preceding vehicle predicting, at a time in advance of the vehicle traveling the road situation, whether or not the road situation will become an accelerator off situation in which an accelerator opening degree of an accelerator pedal becomes off; and stopping the regenerating of the exhaust catalyst when the road situation actually becomes the accelerator off situation, after it is predicted in advance that the road situation will become the accelerator off situation.

6. The method according to claim 5, further comprising:

acquiring an accelerator opening degree;

determining whether or not the accelerator opening degree is off; and opening an EGR valve arranged in an EGR passage of the EGR system, in a case where it is determined that the accelerator opening degree is off.

7. The internal combustion engine according to claim 1, wherein the accelerator off situation is a situation where a gradient of the road on which the vehicle is planned to travel is equal to or higher than a given gradient threshold, or a relationship between the vehicle and a preceding vehicle is a given relationship.

* * * * *